(12) United States Patent
Zubrin et al.

(10) Patent No.: US 7,506,685 B2
(45) Date of Patent: Mar. 24, 2009

(54) APPARATUS AND METHOD FOR EXTRACTING PETROLEUM FROM UNDERGROUND SITES USING REFORMED GASES

(75) Inventors: Robert M. Zubrin, Indian Hills, CO (US); Mark H. Berggren, Golden, CO (US)

(73) Assignee: Pioneer Energy, Inc., Lakewood, CO (US)

( * ) Notice: Subject to any disclaimer, the term of this patent is extended or adjusted under 35 U.S.C. 154(b) by 0 days.

(21) Appl. No.: 11/392,898

(22) Filed: Mar. 29, 2006

(65) Prior Publication Data

US 2007/0227729 A1    Oct. 4, 2007

(51) Int. Cl.
   *E21B 19/00*   (2006.01)
   *E21B 43/16*   (2006.01)
(52) U.S. Cl. .................. 166/75.11; 166/90.1; 166/268; 166/302
(58) Field of Classification Search .................. None
   See application file for complete search history.

(56) References Cited

U.S. PATENT DOCUMENTS

| 2,595,979 | A | * | 5/1952 | Pevere et al. ................. 166/303 |
| 3,193,006 | A | | 7/1965 | Lewis |
| 3,617,471 | A | | 11/1971 | Schlinger et al. |
| 3,725,246 | A | | 4/1973 | Kmercak et al. |
| 3,918,263 | A | | 11/1975 | Swingle |
| 4,024,912 | A | | 5/1977 | Hamrick et al. |

(Continued)

FOREIGN PATENT DOCUMENTS

WO    WO 03/018958    3/2003

(Continued)

OTHER PUBLICATIONS

Asghari et al., "Optimization of Carbon Dioxide Sequestration and Improved Oil Recovery in Oil Reservoirs", University of Regina, Saskatchewan, Canada, S4S 0A2; 9 pages, at least as early as Mar. 29, 2006.

(Continued)

*Primary Examiner*—Zakiya W Bates
*Assistant Examiner*—Angela M DiTrani
(74) *Attorney, Agent, or Firm*—Swanson & Bratschun L.L.C.; Dan Hussain

(57) ABSTRACT

Methods and apparatus for removing oil or natural gas from the ground. In one example, the method may include reforming a fuel source by reaction with water to generate driver gas, and injecting the driver gas into the oil well. The reforming operation may include causing the combustion of a combustible material with ambient oxygen for the release of energy; and heating a reforming reaction fuel and water sources, with the energy released from the combustion of the combustible material, to a temperature above that required for the reforming reaction wherein the fuel and water sources are reformed into driver gas. In one example, the amount of the combustible material combusted is sufficient to result in the release of enough energy to heat an amount of the reforming reaction fuel and water sources to the temperature above that required for the reforming reaction to proceed. The driver gas may be used to help extract oil from the ground and especially oil from depleted oil wells. It may also be used to drive natural gas trapped underground or in coal beds to the surface.

26 Claims, 4 Drawing Sheets

U.S. PATENT DOCUMENTS

| | | |
|---|---|---|
| 4,141,417 A | 2/1979 | Schora et al. |
| 4,183,405 A | 1/1980 | Magnie |
| 4,186,800 A | 2/1980 | Allen |
| 4,217,956 A | 8/1980 | Goss et al. |
| 4,241,790 A | 12/1980 | Magnie |
| 4,261,420 A * | 4/1981 | Hitzman ............ 166/246 |
| 4,299,286 A | 11/1981 | Alston |
| 4,372,386 A | 2/1983 | Rhoades et al. |
| 4,444,257 A | 4/1984 | Stine |
| 4,446,919 A | 5/1984 | Hitzman |
| 4,508,064 A | 4/1985 | Watanabe |
| 4,597,441 A | 7/1986 | Ware et al. |
| 4,622,275 A | 11/1986 | Noguchi et al. |
| 4,659,634 A | 4/1987 | Struthers |
| 4,691,771 A | 9/1987 | Ware et al. |
| 4,706,751 A | 11/1987 | Gondouin |
| 5,033,940 A | 7/1991 | Baumann |
| 5,079,103 A | 1/1992 | Schramm |
| 5,105,887 A | 4/1992 | Hewgill et al. |
| 5,133,406 A | 7/1992 | Puri |
| 5,145,003 A | 9/1992 | Duerksen |
| 5,590,518 A | 1/1997 | Janes |
| 5,674,053 A | 10/1997 | Paul et al. |
| 5,687,559 A | 11/1997 | Sato |
| 5,755,089 A | 5/1998 | Vanselow |
| 5,769,165 A | 6/1998 | Bross et al. |
| 5,769,610 A | 6/1998 | Paul et al. |
| 6,016,867 A | 1/2000 | Gregoli et al. |
| 6,016,868 A | 1/2000 | Gregoli et al. |
| 6,306,917 B1 | 10/2001 | Bohn et al. |
| 6,328,104 B1 | 12/2001 | Graue |
| 6,431,840 B1 | 8/2002 | Mashimo et al. |
| 6,458,478 B1 | 10/2002 | Wang et al. |
| 6,503,649 B1 | 1/2003 | Czajkowski et al. |
| 6,581,684 B2 * | 6/2003 | Wellington et al. ......... 166/245 |
| 6,653,005 B1 | 11/2003 | Muradov |
| 6,821,501 B2 * | 11/2004 | Matzakos et al. ........... 423/652 |
| 6,893,755 B2 | 5/2005 | Leboe |
| 7,056,482 B2 | 6/2006 | Hakka et al. |
| 7,067,456 B2 | 6/2006 | Fan et al. |
| 7,089,907 B2 | 8/2006 | Shinagawa et al. |
| 7,100,692 B2 | 9/2006 | Parsley et al. |
| 2004/0163311 A1 | 8/2004 | Ahmed et al. |
| 2007/0227729 A1 | 10/2007 | Zubrin et al. |

FOREIGN PATENT DOCUMENTS

WO    WO 2005/007776    *    1/2005

OTHER PUBLICATIONS

Notification of Transmittal of the International Search Report and the Written Opinion of the International Searching Authority, or the Declaration.

Notification of the International Application Number and of the International Filing Date.

Notification of Transmittal of the International Search Report and the Written Opinion of the International Searching Authority, or the Declaration dated Oct. 10, 2007.

Notification of the International Application Number and of the International Filing dated May 11, 2007.

* cited by examiner

APPARATUS AND METHOD FOR EXTRACTING PETROLEUM FROM UNDERGROUND SITES USING REFORMED GASES

FIELD OF THE INVENTION

This invention relates to extraction of underground gasses and liquids and more particularly to petroleum and/or natural gas extraction using reformed gas.

BACKGROUND OF THE INVENTION

Currently there are thousands of depleted oil and natural gas wells in the United States, which collectively possess significant amounts of petroleum resources that cannot currently be extracted using conventional extraction techniques.

Accordingly, as recognized by the present inventors, what is needed is a method and apparatus for extracting oil/petroleum from the ground or from oil wells, such as depleted oil wells.

It is against this background that various embodiments of the present invention were developed.

BRIEF SUMMARY OF THE INVENTION

In light of the above and according to one broad aspect of one embodiment of the present invention, disclosed herein is a method for generating and using hydrogen and carbon dioxide rich gas mixtures for driving oil from an oil well. In addition, and in accordance with another broad aspect of an embodiment of the present invention, disclosed herein is a method for generating and using hydrogen and carbon dioxide gas mixtures for driving trapped natural gas out of the ground.

In one example, the methods of the invention include reforming or reacting a fuel or other hydrocarbon source with water to generate hydrogen-carbon dioxide rich "driver gas" mixtures and injecting the driver gas into the oil well. The fuel or hydrocarbon sources used for generation of driver gas include, but are not limited to, alcohols, olefins, paraffins, ethers, aromatic hydrocarbons, and the like. In addition, the fuel sources can be from refined commercial products such as propane, diesel fuels, gasolines or unrefined commercial products such as crude oil or natural gas. The water can be introduced into the reforming reactor as liquid water, as steam, or, if the fuel is an alcohol or other substance miscible in water, as a component premixed with the fuel.

In preferred embodiments the fuel source for the reforming reaction is an unrefined product such as crude oil, and in some embodiments, a crude oil captured from the same oil well where the driver gas is being injected.

The reforming reaction can be driven by the release of energy from a combustible or non-combustible source such as electricity. In preferred embodiments the energy is provided by a combustion reaction using a combustible material, and atmospheric air.

In preferred embodiments the driver gas is a hydrogen-carbon dioxide rich gas mixture.

The method may also include the addition of a catalyst to the reforming reaction. The catalyst reduces the temperature required to reform the fuel source.

According to another broad aspect of another embodiment of the present invention, disclosed herein is an apparatus for removing oil from an oil well. In one example, the apparatus may include a first storage container for storing a combustible material used in the combustion reaction; a second storage container for storing a fuel or alternative hydrocarbon source used in the reforming reaction; a third storage container for water to be reacted with fuel in the reformer; a first chamber having an inlet and an outlet, the first chamber for combusting the combustible material with ambient oxygen for the release of energy, the inlet of the first chamber fluidly coupled with the first storage container; and a second chamber having an inlet and an outlet, the inlet of the second chamber fluidly coupled with the second and third storage containers, a portion of the second chamber positioned within a portion of the first chamber, the second chamber fluidly isolated from the first chamber. In one example, the energy released in the first chamber heats the fuel and water sources used in the reforming reaction in the second chamber to a temperature above that necessary for the reforming reaction thereby reforming the fuel and water sources into driver gas exiting the outlet of the second chamber.

In one example, the first chamber includes an igniter for igniting the combustible material, and the second storage container may include a mixture of water with the reforming reaction fuel source. The second chamber may be adapted to receive a catalyst to reduce the temperature and amount of energy required to heat the reforming reaction fuel and water sources to a temperature above that necessary for the reforming reaction to proceed.

In another embodiment, the apparatus may include a first heat exchanger coupled with the outlet of the first chamber and thermodynamically coupled with the second chamber, the first heat exchanger for pre-heating the reforming reaction fuel and/or water sources. The apparatus may also include a second heat exchanger coupled with the outlet of the second chamber and thermodynamically coupled with the inlet of the second chamber, the second heat exchanger for pre-heating the reforming reaction fuel and or water sources and for cooling the generated driver gas.

According to another broad aspect of another embodiment of the present invention, disclosed herein is an autothermal apparatus for generating driver gas to remove oil from an oil well. In one example, the apparatus may include a single reaction chamber for combining a reforming fuel source, water, and an oxidizer; a reforming reaction fuel delivery pipe for delivery of the reforming fuel source; another pipeline for water; an oxidizing agent delivery pipe for delivery of oxygen or other like oxidizing agent; and a driver gas outlet port for removal of driver gas produced in the reaction chamber. In one example, a counter-flow heat exchanger provides energy/heat from the released driver gas to the incoming reformer fuel to facilitate the autothermal reformer reaction in the reaction chamber.

In one example of the autothermal reformer apparatus, a reaction chamber heater pre-heats the reaction chamber to initiate the reforming reaction and subsequent formation of driver gas. In another example, the reaction chamber includes a catalyst bed to facilitate autothermal reforming of appropriate reforming fuel sources.

The features, utilities and advantages of the various embodiments of the invention will be apparent from the following more particular description of embodiments of the invention as illustrated in the accompanying drawings.

DETAILED DESCRIPTION OF THE INVENTION

Embodiments of the present invention provide for the creation of driver gas which is used for extracting oil from an otherwise depleted oil well, or to drive trapped reservoirs of underground natural gas to the surface. For purposes of the present invention a driver gas is typically any gas formed during the reforming reactions of the present invention and is preferably a hydrogen-rich gas or hydrogen and carbon dioxide containing gas. Various embodiments of the present invention are disclosed herein. Note that the majority of the disclosure is directed toward creating a driver gas that is ultimately injected into depleted oil wells for the extraction of oil, however, methods and apparatus of the invention can also be used to create driver gases useful in driving trapped natural gas to the surface. As such, it is noted that the scope of the present invention encompasses the use of driver gas created in accordance with the present invention to drive out other materials beyond oil from depleted oil wells, and in particular encompasses using driver gas to drive trapped natural gas out of underground natural gas reservoirs.

Figure 1:
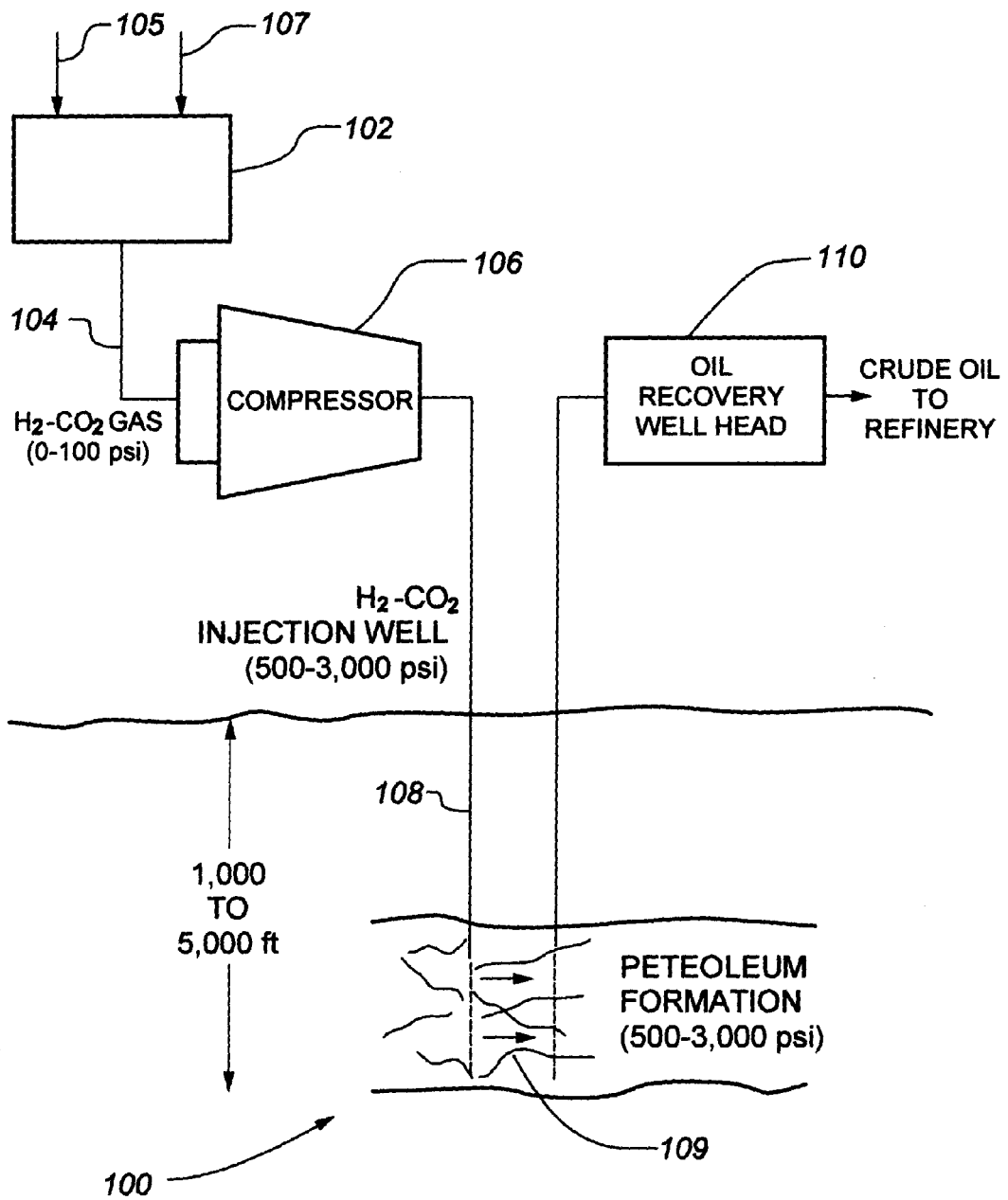
FIG. 1 illustrates an example of an embodiment of the present invention for the extraction of oil from an oil well, in accordance with one embodiment of the present invention.

In FIG. 1, a below-ground oil well 100 (which may be otherwise depleted) is illustrated, having an amount of oil therein such as a residual amount of oil. A portable, self-contained reformer 102 in accordance with the present invention generates driver gas (shown as arrow 104) which may be pumped into the oil well for removing the residual oil from the oil well. As explained herein, the reformer 102 may reform or react fuel sources (shown as arrow 105) such as alcohols, olefins, paraffins, ethers, aromatic hydrocarbons, and other like materials (or mixtures thereof) with (shown as arrow 107) (or without) water to form driver gas which, in one example, is hydrogen and carbon dioxide rich gas mixture. The driver gas is then compressed by a compressor 106 into high pressure gas that could be pumped underground (see line 108) where it could impose pressure on residual underground petroleum 109 sufficient to allow it to be extracted by a nearby oil well 110 or other like site.

Figure 2:
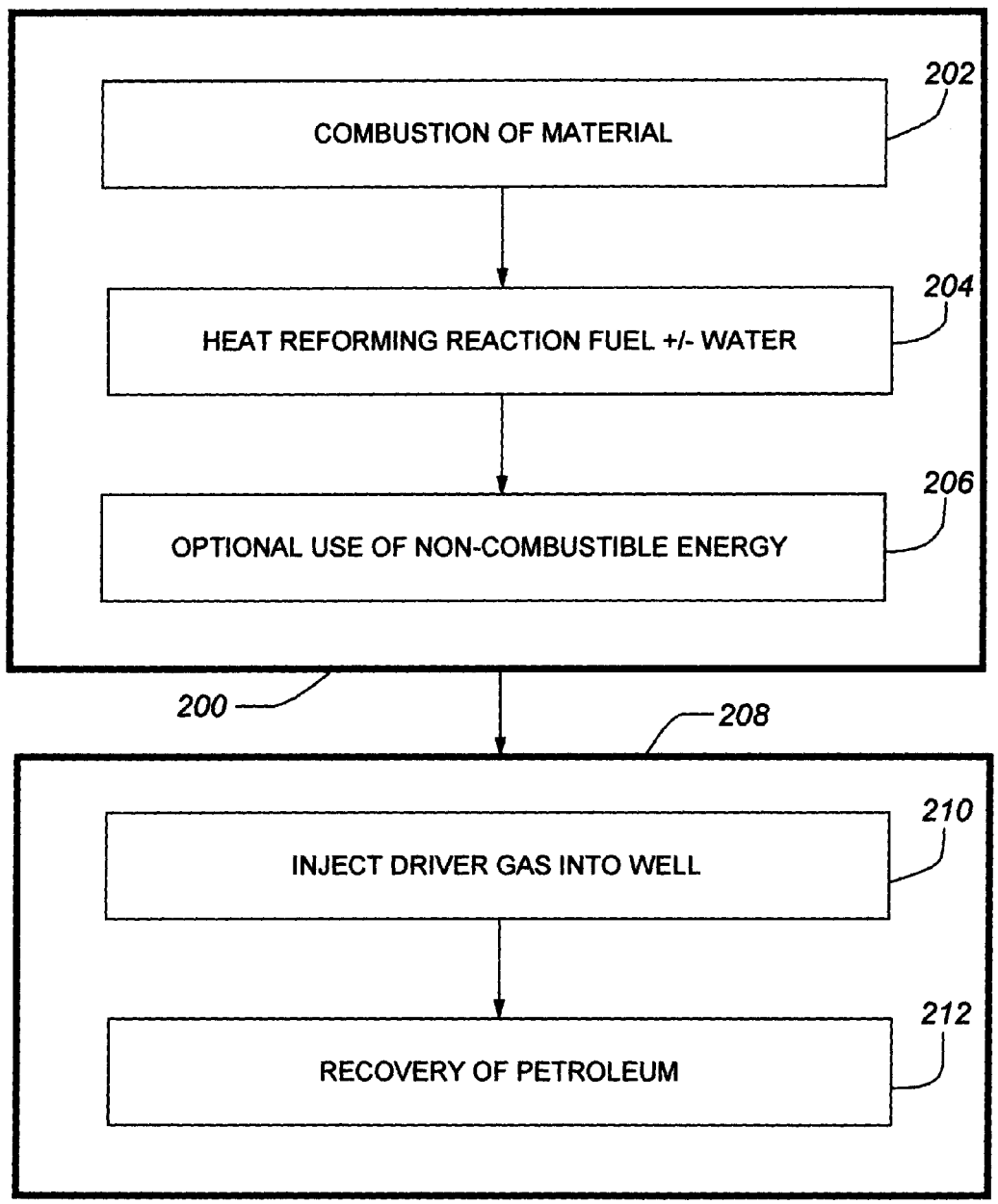
FIG. 2 illustrates an example of operations for extracting oil from an oil well, in accordance with one embodiment of the present invention.

FIG. 2 illustrates an example of operations which may be performed in order to drive petroleum resources out of the ground, such as out of an oil well or a depleted oil well. At operation 1 (shown as box 200), a fuel source is reformed into driver gas. In one example, operation 1 may include combustion of a material 202 such as methanol or ethanol, in order to provide energy, for instance, within a combustion chamber. The energy generated from the combustion may be used to heat the reforming reaction fuel source to a temperature where the fuel source reacts with (or without) water to form a hydrogen-rich driver gas 204. Note that the energy required to drive the reforming reaction can also be provided from a non-combustible source, for example, solar energy, nuclear energy, wind energy, grid electricity, or hydroelectric power 206.

At operation 2 (shown as box 208), the driver gas is injected into the oil well in order to drive petroleum out of the ground 210. For instance, the injected gas could soften highly viscous petroleum residues and displace them, thereby mobilizing such petroleum residues for recovery by conventional means 212.

Embodiments of the present invention provide reformer apparatus for generating driver gas used in petroleum extraction, from among other sites, depleted oil wells. Apparatus embodiments of the invention are portable, self-contained and energy efficient, able to generate driver gas through reforming of a fuel source. Each apparatus utilizes a reforming reaction to generate the driver gas and a combustion reaction to provide the energy required to reform a fuel and generate the driver gas. Various apparatus embodiments are provided herein based on either separating the reforming reaction from the combustion reaction or based on combining the reforming reaction with the combustion reaction (referred to herein as autothermal reforming). In addition, the apparatus typically includes heat exchange elements to facilitate heat transfer from the high temperature driver gas to incoming reformer and/or combustion fuel. The transfer of heat facilitating the reforming reaction and lowering the energy required to complete the driver gas formation. Note that various apparatus configurations are envisioned to be within the scope of the present invention as long as the apparatus provides for on-site, portable, energy efficient reforming reactions (and preferably steam reforming reactions) that produce driver gas useful in the extraction of petroleum products from an underground source. As such, a first illustrative embodiment is described in FIG. 3 for separate reformer and combustion reactions, followed by an embodiment described in FIG. 4 for autothermal reforming and production of driver gas from a single reaction chamber.

Reformer Apparatus

Figure 3:
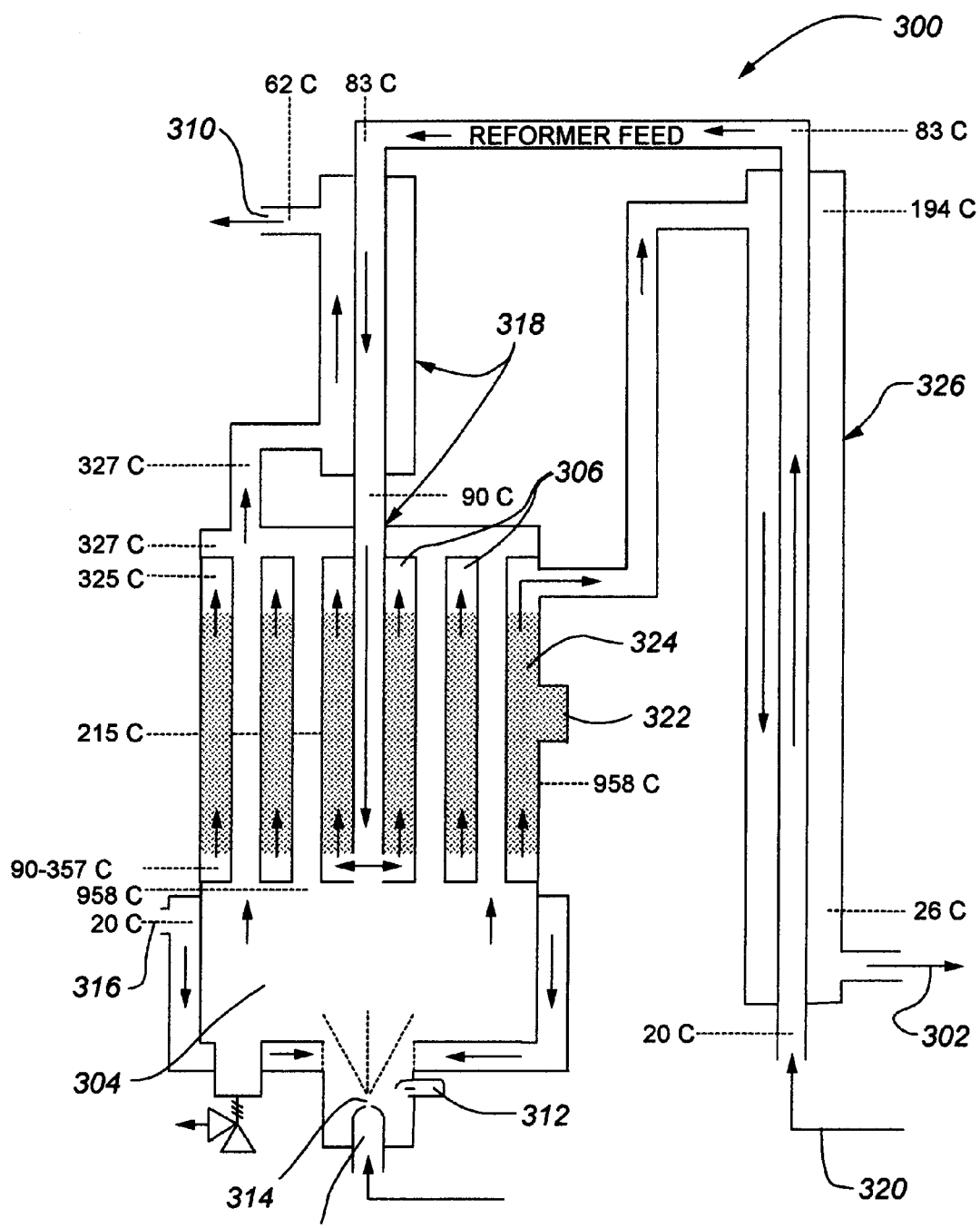
FIG. 3 illustrates an example of an apparatus for extracting oil from an oil well, in accordance with one embodiment of the present invention.

FIG. 3 illustrates an example of a self-contained, portable apparatus 300 for generating driver gas (shown as arrow 302) for injection into the ground or an oil well, in accordance with one embodiment of the present invention.

In FIG. 3, an embodiment of the apparatus may include a first storage container 304 storing a combustible material, such as an alcohol or olefin. A second storage container 306 is also provided, which may include a reforming reaction fuel source, such as an alcohol, olefin, paraffin, and the like or mixtures thereof. If the reformer fuel is an alcohol or other chemical miscible in water, the water may be mixed with the fuel in this container. If the reformer fuel is a hydrocarbon such as a paraffin not miscible in water, a third container (not shown) is required for the water to be reacted with the fuel in the reformer chamber.

In one example, a first chamber 304 has an inlet port 308 and an outlet port 310 and is adapted to provide for the combustion of the combustible material. In one example, the first chamber includes an igniter such as a spark plug 312 or other conventional igniter, and a nozzle 314 coupled with the inlet port 308 of the first chamber 304. The inlet port 308 of the first chamber may be coupled with the first storage container so that the contents of the first storage container may be introduced into and combusted within the first chamber. The first chamber also includes a port 316 for introducing combustion air into the first chamber. The first chamber is also adapted to receive a portion of the second chamber 306, described below, so that the energy/heat from the combustion of the combustible material from the first storage container within the first chamber is transferred into a portion of the second chamber. The outlet port 310 of the first chamber, in one example, is near the inlet port of the second chamber (not shown), and a heat exchanger is used to allow the combustion exhaust gas to heat the fuel and water entering the second chamber. Alternatively, the outlet of the first chamber can feed to a heat exchanger 318 located inside the second chamber, which thereby allows the combustion exhaust gases produced in the first chamber to provide the heat to drive the reforming reactions in the second chamber.

The second chamber 306 has an inlet port (shown as arrow 320) and an outlet port 302. In one example, the inlet port is coupled with the second storage container and receives the contents of the second and third storage containers. The second chamber may also include a port 322 for receiving catalyst material within the second chamber.

In one example, the second chamber is positioned within the first chamber, such that the combustion heat/energy from the first chamber heats the reforming reaction fuel and water sources contained within the second chamber to a point where the fuel source vaporizes and reforms into a driver gas which exists out of the outlet port of the second chamber. In one example, the first and second chambers are fluidly isolated.

A catalyst 324 may be utilized within the second chamber in order to reduce the temperature and amount of energy required to heat the reforming reaction fuel and water sources to their reaction temperature, and such catalysts are dependent upon the fuel source but include iron based catalyst, zinc oxide, copper based catalyst, alumina, and the like.

In one example, a first heat exchanger 318 is coupled with the outlet port of the first chamber (the combustion chamber) and is thermodynamically coupled with a portion of the inlet port of the second chamber. In this manner, the hot combustion exhaust gases from the first chamber are used to preheat the reforming reaction fuel and or water sources as they are being introduced into the second chamber for vaporization/reformation into a driver gas.

A second heat exchanger 326 may also be utilized, wherein the second heat exchanger 326 is thermodynamically coupled with the outlet ports 302 and the inlet port 320 of the second chamber, which provides the dual benefit of preheating the reforming reaction fuel and/or water sources prior to entry into the second chamber, as well as cooling the driver gas which is expelled from the outlet ports of the second chamber. Note that various illustrative temperatures are shown to illustrate heat-exchange, but are not meant to limit the range of temperatures useful in the present invention.

Figure 4:
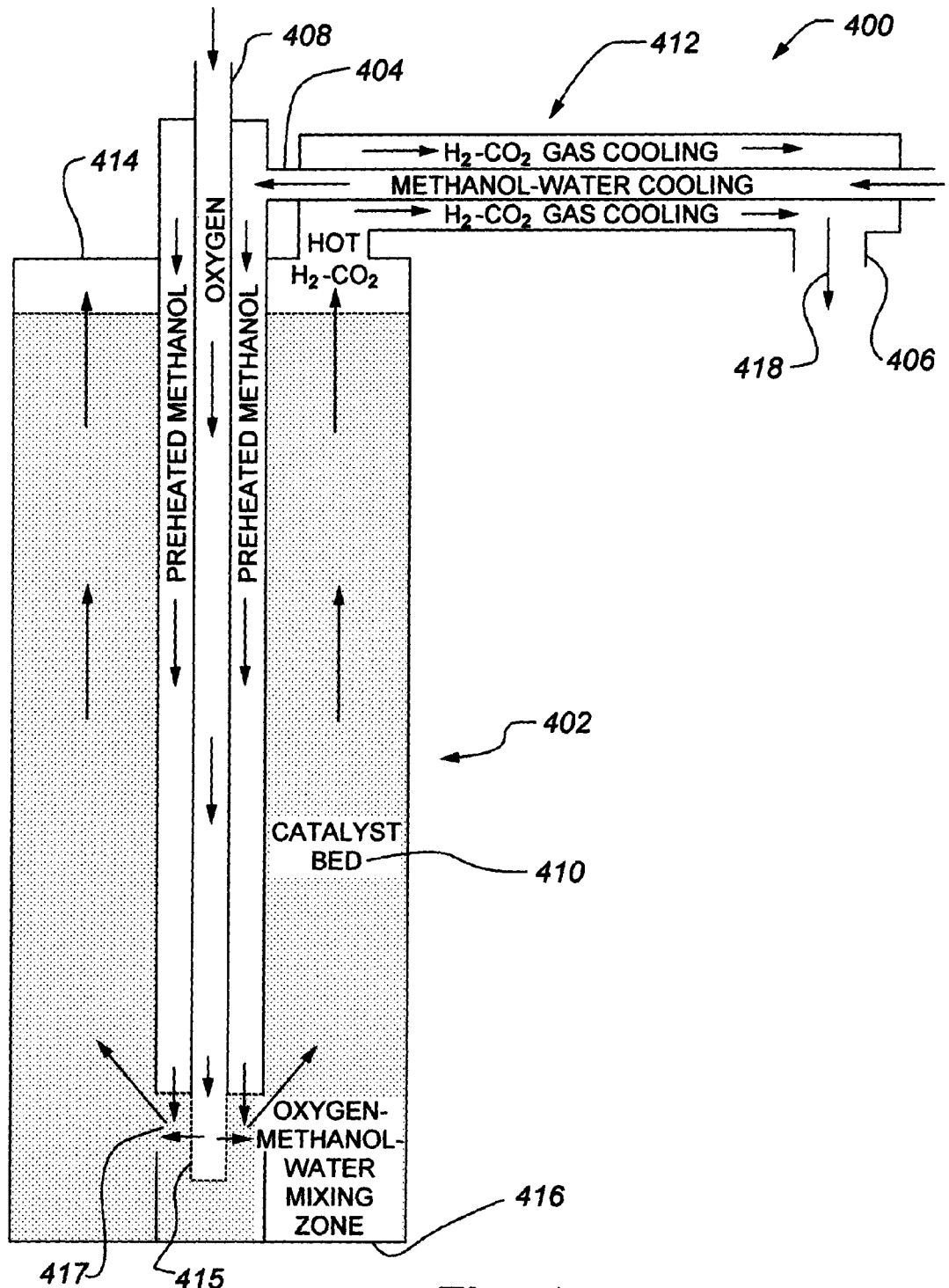
FIG. 4 illustrates another example of an apparatus for extracting oil from an oil well, in accordance with one embodiment of the present invention.

FIG. 4 illustrates another example of a self-contained portable apparatus 400 for generating driver gas for injection into the ground or an oil well, in accordance with another embodiment of the present invention. The embodiment illustrated in FIG. 4 provides what the inventors term an "autothermal reformer" for the production of driver gas which is injected into the ground or an oil well (to remove oil or natural gas or other like materials).

An autothermal reformer 400 of the present invention directly reacts a reformer fuel source with oxygen or other like oxidizers in a single chamber 402. Embodiments of the reformer provide an environment for reforming a fuel source with a feed at proper temperature and pressure resulting in the release of driver gas. Since the reforming reaction is favored by low pressure, in preferred embodiments pressure in the autothermal reactor should be kept under 50 bar. Embodiments of the autothermal reformer combine counter-flow heat exchange elements to enhance heat transfer and energy efficiency of the autothermal reformer.

FIG. 4 shows one embodiment of the autothermal reformer apparatus 400 of the invention. Note that other autothermal reformer apparatus are envisioned to be within the scope of the present invention as long as they provide at least a reaction chamber with a reforming reaction fuel source inlet, an air or oxidizing agent inlet and a driver gas outlet.

Referring to FIG. 4, an autothermal reformer apparatus 400 is shown having a reaction chamber 402, a reforming reaction fuel delivery pipe (fuel pipe) 404 for delivery of a reforming reaction fuel, a driver gas outlet port (outlet port) 406 for release of produced driver gas, and an oxygen or other like gas inlet pipe (gas pipe) 408 for delivery of a gas used in the combustion of the reforming reaction fuel in the reaction chamber.

Still referring to FIG. 4, the reaction chamber 402 is of sufficient size and shape for autothermal reforming of a fuel source. Different chamber geometries can be used as long as they constrain the autothermal reforming reactions of the present invention and provide sufficient chamber space to produce an amount of driver gas necessary at an oil extraction site. A catalyst bed (see below) 410 is typically integrated into the reaction chamber for optimized autothermal reforming reactions. In the embodiment shown in FIG. 4, The fuel pipe 404 is coupled to the outlet port to form a counter-exchange heat exchanger 412 so that the energy/heat from the exiting driver gas is transferred to the reforming fuel entering the reaction chamber via the fuel pipe. In addition, the fuel pipe 404 typically enters at a first or top end 414 of the reaction chamber and releases the fuel toward the second or bottom end 416 of the reaction chamber. This configuration enhances heat release from the heated reformer fuel into the contents of the reaction chamber. Release of fuel into the chamber 402 can be via a nozzle 415 or other like device. The gas pipe 408 is typically coupled to or adjacent to the fuel pipe and releases the oxygen or other like gas adjacent to the release of the reformer fuel 417. Note that other configurations of reformer fuel and water delivery, oxygen or other oxidizing agent delivery and driver gas release are envisioned to be within the scope of the invention and are shown in FIG. 4 as an illustration of one embodiment.

In use, the reaction chamber of the autothermal reformer apparatus is typically preheated to a temperature sufficient to start the reforming reaction, i.e., between 200° C.-400° C. Preheating can be accomplished by a reaction chamber integrated heating element, a heating coil, an external combustor heating system, or other like device (not shown).

The reformer fuel source (with or without water, see below) is fed into the reaction chamber via the fuel pipe 404. Note that once driver gas is produced in the reaction chamber, the reformer fuel is heated prior to delivery into the reaction chamber by the exiting driver gas (shown as arrow 418) via the counter-flow heat exchanger. At approximately the same time that the reformer fuel is being delivered to the reaction chamber, the oxygen or other oxidizing agent being delivered to the reaction chamber via the inlet pipe. Various reformer chemical reactions are described below.

Once the reforming reaction has been established within the reaction chamber the reaction chamber heating element may be shut off to conserve energy. Note also that the amount of water combined into the reforming fuel can be adjusted to control the reforming temperatures.

Chemical Processes

The generation of driver gas(es) will now be described, for example generating hydrogen rich gas, i.e., a mixture of hydrogen gas ($H_2$), carbon monoxide (CO) and/or carbon dioxide ($CO_2$). The constituents of driver gas produced by embodiments of the present invention is determined by the reaction constituents and conditions as described below, but generally include at least hydrogen gas.

Embodiments of the present invention provide processes for producing driver gas from the reforming of select fuel sources, such as solid, liquid and/or gaseous hydrocarbons, alcohols, olefins, paraffins, ethers, and other like materials. Illustrative fuel sources for use in the reforming reaction include, but are not limited to, methanol, ethanol, propane, propylene, toluene and octane.

The combustor fuel can include both refined commercial products such as propane, diesel fuel, and/or gasoline, or unrefined substances such as crude oil, natural gas, coal, or wood. In preferred embodiments the driver gas mixture is generated from the steam reforming of fuels such as methanol or ethanol. In other preferred embodiments the driver gas is generated by reforming unrefined hydrocarbon sources such as crude oil, especially crude oil obtained from the oil well site where the driver gas is being injected.

The methods of the invention are reproducible and easily performed in the portable inventive devices described herein. The processes of the invention are superior to electrolytic hydrogen generation which require large amounts of electrical power and are typically non-portable. The preferred processes of the invention are also superior to the production of hydrogen by cracking or pyrolyzation of hydrocarbons without the use of water because much more driver gas is produced for a given amount of fuel consumed.

The methods of the invention use easily obtained fuel sources such as a hydrocarbon sources, water, and atmospheric air.

Embodiments of the invention also include combustible materials to supply the energy to drive the reforming reactions of the present invention. Combustible reactions can include a source of energy that is burned with ambient oxygen for the release of energy. Note that in alternative embodiments of the invention, the energy required to drive the reforming reactions of the invention can be provided by non-combustion sources, such as solar, nuclear, wind, grid electricity, or hydroelectric power.

In some embodiments of the invention, the reforming reaction to generate hydrogen rich gas and combustion reactions to drive that reaction both incorporate the same fuel. For example, methanol can be used as the reforming fuel source and as the source of combustion to drive the reforming reaction.

In more detail, the invention provides reforming processes of any reforming fuel source to generate, for example, $H_2$, CO and/or $CO_2$. The driver gas forming reactions of the invention are endothermic, requiring an input of energy to drive the reaction toward fuel reformation.

In one embodiment, the energy required to drive the reforming reaction is provided through the combustion of any combustible material, for example an alcohol, a refined petroleum product, crude petroleum, natural gas, wood, or coal that provides the necessary heat to drive the endothermic steam reforming reaction.

In another embodiment, the energy required to drive the reforming reaction is provided via any non-combustible source sufficient to generate enough heat to drive the reforming reaction to substantial completion.

The present combination of reforming and combustion reactions can be performed within a portable reaction vessel, for example the devices described herein (see FIG. 3 and FIG. 4). This is in contrast to electrolysis hydrogen gas formation which requires large amounts of electrical power and non-portable machinery for the generation of the gas.

The following reactions provide illustrative processes for reforming a fuel source to produce a driver gas used in the recovery of oil or other like materials. Several illustrative combustion reactions that provide the energy required to drive those reforming reactions are also provided. In one embodiment, provided as Reaction 1, a hydrogen rich gas is formed using pure methanol. Note that the reforming reaction and combustion reaction can be performed in separate reaction chambers (see FIG. 3) or can be combined and performed in a single reaction chamber (see FIG. 4). The following 12 reactions illustrate a separation of the reforming and combustion reactions, however, as is shown in FIG. 4 and discussed in greater detail below, an autothermal reforming reaction can be accomplished by directly reacting the fuel sources of the invention with oxygen in a single reaction chamber. These autothermal reactions can be performed in the presence or absence of water.

Separate chamber reactions (see FIG. 3):

Reaction 1: $CH_3OH \rightarrow CO + 2H_2$

Reaction 1 comes with an ΔH of +128.6 kJoules/mole. This means that this same amount of energy must be contributed by the combustion reaction to drive the reaction toward the formation of CO and $H_2$.

In an alternative embodiment, the reformed fuel, e.g., methanol, can be mixed with water as shown in reaction 2:

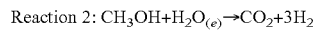
Reaction 2: $CH_3OH + H_2O_{(e)} \rightarrow CO_2 + 3H_2$

Reaction 2 comes with an ΔH of +131.4 kJoules/mole. As above in Reaction 1, for a small price in energy, an appropriate fuel source can be cracked to form hydrogen gas, carbon monoxide and/or carbon dioxide. If we compare Reaction 2 to Reaction 1, we observe that for essentially the same energy, the use of water allows the hydrogen yield to be increased by 50%. This is why it is generally advantageous to employ both water and fuel in the proposed reforming system.

Reactions 3-8 illustrate several other reforming reaction fuel reactions that are in accordance with the present invention.

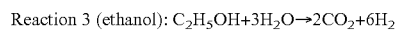
Reaction 3 (ethanol): $C_2H_5OH + 3H_2O \rightarrow 2CO_2 + 6H_2$

Reaction 4 (propane): $C_3H_8 + 6H_2O \rightarrow 3CO_2 + 10H_2$

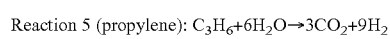
Reaction 5 (propylene): $C_3H_6 + 6H_2O \rightarrow 3CO_2 + 9H_2$

Reaction 6 (toluene): $C_7H_8 + 14H_2O \rightarrow 7CO_2 + 18H_2$

Reaction 7 (octane): $C_8H_{18} + 16H_2O \rightarrow 8CO_2 + 25H_2$

Reaction 8 (methane): $CH_4 + 2H_2O \rightarrow CO_2 + 4H_2$

Note that in general Reactions 1-8 (as well as other reforming reactions of the invention) result in large increases in the number of molecules of products compared to reactants, so all are benefited by being performed under low pressure.

In alternative embodiments the reforming reaction is performed in the presence of a catalyst, for example, when the reforming reaction fuel is an alcohol, e.g., methanol or ethanol, which is combined with water, the feed is passed over a copper on alumina, copper on zinc oxide, or other copper-based catalyst at temperatures above 250° C. (although better results may be obtained at higher temperatures). Thus, for example, the reactor chamber in FIG. 4 could be prepared with a copper on zinc oxide catalyst when the reformer fuel is an alcohol.

When the reforming reaction fuel is a hydrocarbon, e.g., paraffins, olefins, aromatics, combined with water, the feed is passed over an iron based catalyst at temperatures above 300° C. (although better results may be obtained at higher temperatures).

When the reforming reaction fuel is methane combined with water, the feed is passed over a nickel or ruthenium based catalyst at temperatures above 500° C. (although better results may be obtained at higher temperatures).

In some embodiments, combinations of olefins, paraffins, and aromatics (as found in crude petroleum) can be used as the reforming reaction fuel source. In other embodiments, a crude petroleum product is used as the reforming reaction fuel source where the crude petroleum product is first treated to remove sulfur or other impurities (sulfur can poison catalyst involved with the reforming reaction). Note that other reforming reaction fuel sources may also need to be pretreated for removal or sulfur or other impurities, for example, natural gas.

In another embodiment of the invention, a reforming reaction fuel source can be generated from a pre-source. In one example, gamma alumina is used to react dimethyl ether with water to make methanol via Reaction 9:

Reaction 9: $(CH_3)_2O + H_2O \rightarrow 2CH_3OH$

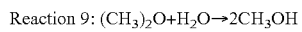

The methanol produced in Reaction 9 can then be reacted with more water via Reaction 2 to produce the driver gas used to obtain oil from depleted oil wells, for example. As such, using a mixed gamma alumina and copper catalyst bed, dimethyl ether and water are reacted to obtain the net result shown in Reaction 10:

Reaction 10: $(CH_3)_2O + 3H_2O \rightarrow 2CO_2 + 6H_2$

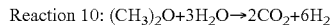

The energy required to drive the reforming reactions is provided by either combustible or non-combustible sources. In preferred reactions the energy is provided by combustion of a combustible material and in some embodiments the combustible material is the same as the reforming reaction fuel source.

An illustrative combustion reaction is shown in Reaction 11. The combustion of a source of fuel supplies the energy to drive reactions 1-10. An illustrative example is the combustion of methanol with ambient oxygen to release ΔH of −725.7 kJoules/mole. Reaction 11 is shown below:

Reaction 11: $CH_3OH_{(e)} + \frac{3}{2}O_2 \rightarrow CO_2 + 2H_2O_{(e)}$

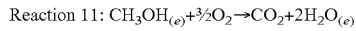

Thus, theoretically (not being bound by any particular theory) for purposes of this illustration, only ⅕ of the mass of methanol is required to be burned to reform methanol via reactions 1 and/or 2. This is a small price to pay given that most fuels used in the reforming reaction are cheap, easy to store as a liquid and readily available, even in remote areas of the world.

In general, the required energy to drive the reforming reactions of the present invention can be furnished by burning small fractions of the reforming reaction fuel source or by using an alternative fuel or other heating methods such as nuclear, solar or electric grid power. In each case, a much larger number of product molecules is produced than is burned or reacted, allowing a much larger amount of fuel to be driven out of the ground than must be used to obtain it. The driver gas consists of mixtures of hydrogen and carbon dioxide, neither of which will react with petroleum, and both of which can serve to reduce its viscosity and provide pressure to drive the petroleum from the ground.

In yet another embodiment, carbon monoxide derived from various reforming reactions is separated away from the hydrogen gas using a "membrane" or other separation device and further burned to provide additional energy to drive the methanol reforming, see Reaction 12.

Reaction 12: $CO + \frac{1}{2}O_2 \rightarrow CO_2$

The burning of CO results in the ΔH of −283.0 kJoules/mole, again releasing heat for use in driving the reforming reactions illustrated in Reactions 1-10.

With regard to autothermal reforming, a reforming fuel is directly reacted with oxygen in the presence or absence of water. In alternative embodiments to facilitate combustion of all of the reforming fuel, oxygen gas, air, or alternative oxidizer materials, e.g., hydrogen peroxide, nitrous oxide, is metered in an amount to react with all of the carbon contained in the reforming fuel. The thermodynamics of the autothermal chemical reactions and the presence of a proper catalyst with proper selection of operating temperature and pressure result in formation of substantially only carbon dioxide and hydrogen gas. However, in use, small amounts of water and other compounds may form by combustion of hydrogen or other byproduct reactions. Where air is used as the oxidizer, there will also be nitrogen left over which can serve as part of the driver gas.

As discussed in greater detail throughout the present disclosure, the reforming of fuel is provided for production of driver gas used in the extraction of oil from the ground or from an oil well. In one embodiment, the generated driver gas, e.g., hydrogen rich gas, is used for recovering materials from currently economically non-viable resources, including extracting oil trapped in depleted wells, liquefying oil shale, and forcing out methane trapped in coal beds. Currently there are thousands of depleted oil wells in the United States, which collectively possess billions of barrels of petroleum resources that cannot conventionally be extracted by economic means.

The driver gas of the present invention is injected into the ground, where it softens highly viscous petroleum residues and displaces and mobilizes them for economic recovery.

These uses compare with the use of helium or other stored compressed gases as driver gas at an oil well recovery site. However, such gases are normally transported at very high pressures (2200 psi) and in very heavy gas bottles (e.g. K-bottles, ~55 kg each with, for example, 1.1 kg of He). Using easily transported methanol to perform Reaction (1) or (2), or better yet, crude petroleum from the site itself, allows the production of a high-hydrogen-concentration gas without a large electrical requirement needed for electrolytic gas generators. In this sense, gas generation for use in the field provides a significant cost benefit over conventional methods for generating a hydrogen rich gas.

Process embodiments of the invention can take place as a reforming reaction between 200 and 400° C., dependent on the fuel source and catalyst, and more preferably at about 400° C. As such, the reforming feed, i.e., fuel and water sources, are heated to boiling temperature, vaporized, then continued to be heated to the above temperature range, where they react to from driver gas. After the reforming reaction, the gas product can be cooled. The heat is provided by combustion of a fuel or via a non-combustible source.

With regard to a combustible reaction to supply the energy to drive the reforming reaction, a spark plug, incandescent wire, or any other common ignition device is typically used to initially start the reaction.

The following description is provided as an illustrative example and is not meant to limit the description herein.

Step 1: Preheat Reformer Feed, Cooling of Gas

The reformer feed (fuel and water) enters the system at 20° C. Use of methanol will be provided for illustrative purposes. The average boiling temperature for the $CH_3OH$ and $H_2O$ is ~90° C. Assuming as an example a small system with a driver gas production rate of 100 standard liters per minute, the heat required to preheat the reformer feed from 20 to 90° C. is 202 J/s. The heat lost during this step is 4 J/s. The aim of this heat exchanger is to have the gas exit at about 35° C. Knowing the preheat will require a total of 206 J/s, the inlet temperature of the hydrogen rich gas needed is calculated to be 130° C. A heat exchanger model shows that a total length of 2.6 m of tube-in-tube exchanger is needed. Coiled, the resulting height is about 9 cm.

Step 2: Begin Boiling Reformer Feed, Begin Cooling Gas

The hydrogen rich gas will be leaving the reaction chamber at about 400° C. As it cools to 130° C., a heat of 613 J/s is produced, 16.5 J/s of which is lost. To vaporize the $CH_3OH$ and $H_2O$, 1308 J/s is needed. Therefore, the gas partially boils the reformer feed. The total length of the tube-in-tube required for this process is 2.1 m. When coiled, the resulting height is about 7 cm. The heat exchangers for steps 1 and 2 are combined into a single unit.

Step 3: Finish Boiling Reformer Feed, Cool the Combustion Gas

After Step 2, the reforming feed still needs 710 J/s to finish vaporizing, and in this step, 42 J/s is lost. As calculated in Step 5, the combustion gas will leave the reformer at about 648° C. Giving the reforming feed the heat it needs to boil brings the combustion gas temperature down to 127° C. This takes a length of 2.8 m of the tube-in-tube exchanger, which is about 10 cm high when coiled.

Step 4: Finish Heating Reformer Feed

The reforming feed is already vaporized and will finish heating when it contacts the top plate of a combustion chamber. Heating the reforming feed from 90° to 400° C. requires 518 J/s. This amount of heat brings the temperature of the combustion gas from 1650° to 1360° C.

Step 5: Reforming Reaction

To reform $CH_3OH$ & $H_2O$, 1080 J/s of power may be used in this example. This section of the heat exchanger also loses 94 J/s to the surroundings. Accommodating this, the combustion gas temperature drops from 1360 to 648° C. The design length of this multiple tube section is about 20 cm.

An equation for determining the heat used or needed for these processes is $Q = \Sigma m C_p \Delta T$. The calculations led to obtaining the $\Delta H$ and heat lost across a given section and the section's length. The heat exchange formulas and calculation methods used for the reformer system design are given in Incropera and DeWitt, 1996.

The following example is provided by way of illustration and is not intended as limiting. An oil recovery estimate of a typical embodiment of the present invention is provided herein. Based on calculations described in U.S. Pat. No. 4,141,417 (incorporated by reference herein) hydrogen was estimated to displace oil from underground reservoirs with a usage of between 400 to 1200 SCF per barrel, depending on the depth of the oil and other like factors. As such, a value of 800 SCF of reformer gas is used in the following calculation for each barrel of oil recovered.

One barrel of oil is equal to 42 gallons which weighs approximately 126 kg. The 800 SCF is equal to 21,600 standard liters, which is 982 moles of reformer gas. If the reformer is using a crude petroleum as the reformer fuel, with an average formula of $CH_2$, then the reforming reaction can be represented by reaction 13:

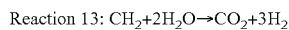

Reaction 13: $CH_2 + 2H_2O \rightarrow CO_2 + 3H_2$

It can also be seen that the produced reformer gas has the same mixture ratio as if it were commercial methanol as the reformer fuel (see Reaction 2). The average molecular weight of the reformer gas in both cases is 12.5 g/mole.

Accordingly, the 982 moles of reformer gas are equal to 12.275 kg, which produces 126 kg of oil or 0.097 kg reformer gas/kg of oil.

However, in the case of Reaction 13, only 14/50 (0.28) of the reformer gas owes its mass to the petroleum. In the case of Reaction 2, 32/50 (0.64) of the reformer gas owes its mass to the methanol.

Therefore, to produce one kg of oil, the reformer needs to use either 0.097×0.28=0.027 kg of oil or 0.097×0.64=0.062 kg of methanol. Using the numbers from Reaction 13, only 2.7% of the oil drawn from the well is required in the reformer in order to drive the rest of the oil out of the well. Alternatively, using the numbers from Reaction 2, 62 grams of methanol is required for every kg of oil produced. Methanol currently is selling for about $0.30/kg. With oil costing approximately $63/barrel, oil is worth about $0.50/kg. In this case, an amount of methanol worth 1.86 cents would recover approximately 50 cents worth of oil, which is a methanol sacrifice equal to 3.72% of the value of the oil produced.

This example shows that using either Reaction 13 or Reaction 2 is economically feasible for the recovery of oil from a depleted oil well. The use of local petroleum appears to be more efficient, but the use of commercial methanol as a reformer feed eliminates the need to eliminate sulfur of other catalyst poisoning contaminants from crude oil prior to catalyst reformation.

Importantly, the above example shows that the reformer embodiments of the present invention, used for producing driver gas, are much more efficient than the partial oxidation techniques taught or suggested in U.S. Pat. No. 4,141,417 ('417). In particular, the '417 patent shows only a partial oxidation reaction that forms half as many moles of driver gas as produced by embodiments of the present invention. Thus, the present invention has double the efficiency of that shown in the prior art '417 patent.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

What is claimed is:

1. A method for recovering oil from an oil-well, comprising:
    reforming methanol in the presence of water to generate a carbon dioxide rich driver gas that includes hydrogen ;
    compressing the driver gas to a pressure appropriate for injection into an oil well;
    injecting the driver gas into the oil-well; and
    recovering oil from the oil-well.

2. The method of claim 1 further comprising:
    causing the combustion of a combustible material for release of energy; and
    heating the methanol and water with energy released from combustion of the combustible material to a temperature above a reforming reaction point wherein the methanol is reacted with water and reformed into the driver gas;
    wherein the combustion results in the release of energy to heat an amount of methanol and water to at least about 150° C.

3. The method of claim 1 further comprising:
    causing the combustion of a combustible material with ambient oxygen for release of energy and;

heating the methanol and water with the energy released from combustion of the combustible material to a temperature above a reforming reaction point wherein the methanol is reacted with water and reformed into the driver gas;

wherein the combustion results in the release of energy to heat an amount of methanol and water to at least about 150° C.

4. The method of claim 3 wherein the combustible material is methanol.

5. The method of claim 1 further comprising:

providing the release of energy from a non-combustible source; and heating the methanol and water with the energy released from the non-combustion source to a temperature above a reforming reaction point wherein the methanol is reacted with water and reformed into the driver gas;

wherein the release of energy to heat an amount of methanol and water is at least about 150° C.

6. The method of claim 1 further comprising:

adding a catalyst to the methanol wherein the catalyst is a copper-based catalyst.

7. The method of claim 1 wherein the driver gas further comprises carbon monoxide.

8. The method of claim 1 wherein a portion of the hydrogen in the driver gas is separated from the driver gas to generate electricity.

9. The method of claim 1 wherein the driver gas further comprises methane.

10. The method of claim 1 wherein methanol and a source of one or more hydrocarbons is reformed in the presence of water.

11. The method of claim 10 wherein the source of one or more hydrocarbons is unrefined.

12. The method of claim 10 wherein the source of one or more hydrocarbons is refined.

13. The method of claim 10 wherein the source of one or more hydrocarbons is coal.

14. A method for recovering oil from an oil-well, comprising:

reforming ethanol in the presence of water to generate a carbon dioxide rich driver gas that includes hydrogen;

compressing the driver gas to a pressure appropriate for injection into an oil well;

injecting the driver gas into the oil-well; and recovering oil from the oil-well.

15. The method of claim 14 wherein the driver gas further comprises carbon monoxide.

16. The method of claim 14 wherein a portion of the hydrogen in the driver gas is separated from the driver gas to generate electricity.

17. The method of claim 14 further comprising:

causing the combustion of a combustible material for release of energy; and heating the ethanol and water with energy released from combustion of the combustible material to a temperature above a reforming reaction point wherein the ethanol is reacted with water and reformed into the driver gas;

wherein the combustion results in the release of energy to heat an amount of ethanol and water to at least about 150° C.

18. The method of claim 14 further comprising: causing the combustion of a combustible material with ambient oxygen for release of energy and;

heating the ethanol and water with the energy released from combustion of the combustible material to a temperature above a reforming reaction point wherein the ethanol is reacted with water and reformed into the driver gas;

wherein the combustion results in the release of energy to heat an amount of ethanol and water to at least about 150° C.

19. The method of claim 18 wherein the combustible material is ethanol.

20. The method of claim 14 thither comprising:

providing the release of energy from a non-combustible source; and heating the and water with the energy released from the non-combustion source to a temperature above a reforming reaction point wherein the ethanol is reacted with water and reformed into the driver gas;

wherein the release of energy to heat an amount of ethanol and water is at least about 150° C.

21. The method of claim 14 further comprising:

adding a catalyst to the ethanol wherein the catalyst is a copper-based catalyst.

22. The method of claim 14 wherein the ethanol and a source of one or more hydrocarbons is reformed in the presence of water.

23. The method of claim 22 wherein the source of one or more hydrocarbons is unrefined.

24. The method of claim 22 wherein the source of one or more hydrocarbons is coal.

25. The method of claim 22 wherein the source of one or more hydrocarbons is refined.

26. The method of claim 14 wherein the driver gas further comprises methane.

* * * * *